(12) United States Patent
Kikuta et al.

(10) Patent No.: US 6,446,768 B2
(45) Date of Patent: Sep. 10, 2002

(54) BRAKE DEVICE ACTUATOR AND BRAKE DEVICE HAVING THE SAME

(75) Inventors: Tomoyuki Kikuta, Toyohashi; Naoki Ueno, Hamamatsu; Takayuki Yamamoto, Aichi-gun, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/818,947

(22) Filed: Mar. 28, 2001

(30) Foreign Application Priority Data

Mar. 31, 2000 (JP) .................................... 2000-098014

(51) Int. Cl.[7] .............................................. B60T 13/74
(52) U.S. Cl. ..................... 188/162; 188/156; 188/157
(58) Field of Search ................................ 188/156, 157, 188/158, 162, 325, 328

(56) References Cited

U.S. PATENT DOCUMENTS

| | | | |
|---|---|---|---|
| 5,000,297 A | * | 3/1991 | Shaw et al. .................. 188/158 |
| 5,024,299 A | * | 6/1991 | Shaw et al. .................. 188/156 |
| 5,150,773 A | * | 9/1992 | Hickey et al. ............. 188/79.55 |
| 5,219,049 A | * | 6/1993 | Unterborn .................... 188/156 |
| 5,310,026 A | * | 5/1994 | Shaw et al. .................. 188/156 |
| 5,590,744 A | * | 1/1997 | Belmond .................... 188/265 |
| 5,855,255 A | * | 1/1999 | Bock et al. .................. 188/162 |
| 6,213,259 B1 | * | 4/2001 | Hanson et al. .............. 188/156 |

OTHER PUBLICATIONS

U.S. patent application Ser. No. 09/592,415, Ueno et al., filed Jun. 15, 2000.

* cited by examiner

*Primary Examiner*—Christopher P. Schwartz
(74) *Attorney, Agent, or Firm*—Law Offices of David G. Posz

(57) ABSTRACT

While a regulation gear is positioned in a disengaged position where the regulation gear is disengaged from a pinion of a driving motor during running of a vehicle, a controller continuously applies a small holding voltage to a switching motor that drives the regulation gear to prevent engagement of the regulation gear with the pinion. The holding voltage is chosen to be relatively small, but enough to prevent engagement of the regulation gear with the pinion upon application of vibrations or shocks encountered during running of the vehicle.

10 Claims, 7 Drawing Sheets

BRAKE DEVICE ACTUATOR AND BRAKE DEVICE HAVING THE SAME

CROSS REFERENCE TO RELATED APPLICATION

This application is based on and incorporates herein by reference Japanese Patent Application No. 2000-98014 filed on Mar. 31, 2000.

BACKGROUND OF THE INVENTION

1. Field of the Invention

The present invention relates to a brake device actuator and a brake device having the same.

2. Description of Related Art

It has been proposed to provide a vehicular brake device that is actuated by an actuator having an electric motor as its driving source. Furthermore, several such vehicular brake devices employ an electric parking brake actuation mechanism instead of a well known cable operated parking brake actuation mechanism. This is due to a fact that the cable operated parking brake actuation mechanism generally has more components than the electric parking brake actuation mechanism. Thus, the cable operated parking brake actuation mechanism generally requires a tedious and time consuming assembling operation.

One brake device having the electric parking brake actuation mechanism is disclosed in U.S. Pat. No. 5,219,049 (corresponding to Japanese Examined Patent Publication No. 6-100239). In this brake device, when the parking brake is activated, an output shaft (rotor), of an actuator is rotated to actuate brake shoes. Once the brake shoes are actuated, the output shaft of the actuator is locked, so that free rotation of the output shaft of the actuator is prevented, thereby preventing movement of the brake shoes to holds the brake shoes in place.

However, the above parking brake actuation mechanism still disadvantageously includes a relatively large number of components.

To solve the above described disadvantages, one type of actuator has been proposed (U.S. patent application Ser. No. 09/592,415 corresponding to Japanese Patent Application No. 11-321479). This actuator has fewer components than the above described prior art. Furthermore, this actuator includes a slipping prevention unit ("lock mechanism") that prevents forceful rotation of an output shaft of a driving motor by an external force transmitted, for example, from the brake shoe side. This unit includes a regulation gear that is provided to regulate the rotation of the output shaft of the driving motor. When the regulation gear is engaged with a pinion secured to the output shaft of the driving motor, the rotation of the output shaft is restricted. On the other hand, when the regulation gear is disengaged from the pinion, the rotation of the output shaft of the driving motor is allowed. Forceful rotation of the regulation gear by vibrations and/or shocks during running of the vehicle is prevented by engaging an engagement recess of the regulation gear with an engagement pin to prevent improper engagement between the pinion and the regulation gear.

However, in this actuator, it is required to provide a limiting member, such as the engagement pin, an elastic unit for biasing the engagement pin or the like, for preventing rotation of the regulation gear during running of the vehicle. Furthermore, in order to release the regulation gear from the engagement pin, a switching motor (acting as an electric switching means) that drives the regulation gear must have an enough torque to overcome the engagement between the engagement recess of the regulation gear and the engagement pin. As a result, the switching motor is disadvantageously required to have a larger output torque to overcome this engagement.

SUMMARY OF THE INVENTION

The present invention addresses the above-described disadvantages. Thus, it is an objective of the present invention to provide a brake device actuator that has a reduced number of components and capable of preventing the improper engagement between the pinion and the regulation gear in the lock mechanism without increasing the output torque of the electric switching means. It is another objective of the present invention to provide a brake device including such a brake device actuator.

To achieve the objectives of the present invention, there is provided an actuator for actuating a brake device. The brake device includes a rotatable body and a friction member. The rotatable body is connected to an axle shaft of a vehicle and integrally rotating with the axle shaft. The friction member is movable between an engaged position where the friction member is biased into engagement with the rotatable body to apply a braking force against the rotatable body and a disengaged position where the friction member is disengaged from the rotatable body. The actuator includes an electric driving means, a driving force transmitting means, a regulating means and an electric switching means. The electric driving means generates a driving force to move the friction member between the engaged position and the disengaged position. The driving force transmitting means transmits the driving force of the electric driving means to the friction member. The regulating means is movable between a transmission prohibiting position where transmission of the driving force by the driving force transmitting means is prohibited and a transmission permitting position where the transmission of the driving force by the driving force transmitting means is permitted. The electric switching means switches the regulating means between the transmission prohibiting position and the transmission permitting position. The electric switching means is energized such that the electric switching means places and holds the regulating means in the transmission permitting position while the vehicle is running. Furthermore, there is also provided a brake device including the above-described actuator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

The invention will be described in connection with an electric vehicular drum brake device with reference to the accompanying drawings.

Figure 1:
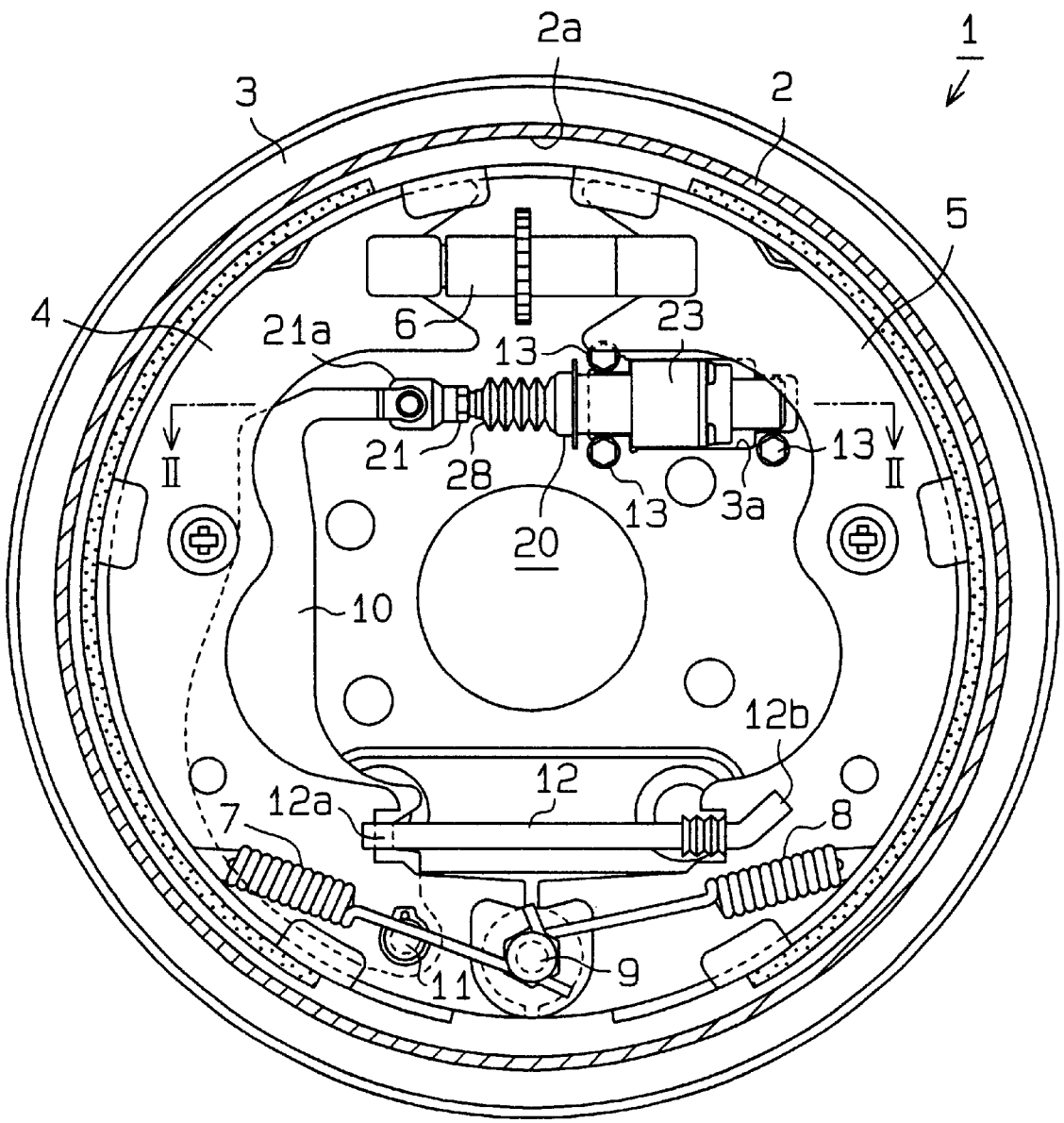
FIG. 1 is a schematic cross-sectional view of a drum brake device according to an embodiment of the present invention.

With reference to FIG. 1, the drum brake device 1 according to one embodiment of the invention is actuated by an actuator 20 that employs an electric motor as its driving source.

In a vehicle, a drum 2 acting as a rotatable body is secured to an axle shaft (not shown) that is rotatably supported by a suspension device (not shown). The drum 2 has an end wall at one end and an open end at the other end. A disk-like back plate or backing plate (actuator mounting member) 3 is secured to a bracket of the suspension device and covers the open end of the drum 2. First and second brake shoes (friction member) 4 and 5 are disposed within an interior of the drum 2. The first and second brake shoes 4 and 5 are supported by the back plate 3 in a manner that permits engagement and disengagement of the brake shoes 4 and 5 relative to an inner peripheral surface 2a of the drum 2.

First end portions (located at the top side in FIG. 1) of the first and second brake shoes 4 and 5 are connected together by an adjuster 6. A stable pin or anchor pin 9 is secured to an outer peripheral region of the back plate 3. Second end portions (located at the bottom side in FIG. 1) of the first and second brake shoes 4 and 5 are connected to the stable pin 9 by return springs 7 and 8, respectively. The biasing force of each return spring 7 or 8 biases the second end of the corresponding brake shoe 4 or 5 into engagement with the stable pin 9. When the second end portion of each brake shoe 4 or 5 is engaged with the stable pin 9, an outer peripheral surface of each brake shoe 4 or 5 is held slightly away from the inner peripheral surface of the drum 2.

The second end portion of the first brake shoe 4 is connected to a second end portion (located bottom side in FIG. 1) of an operation lever 10 by a connecting pin 11. The second end portion of the operation lever 10 is also connected to a first end portion 12a (located at the left side in FIG. 1) of a connection bar 12. A second end portion 12b (located at the right side in FIG. 1) is connected to the second end portion of the second brake shoe 5.

Figure 2:
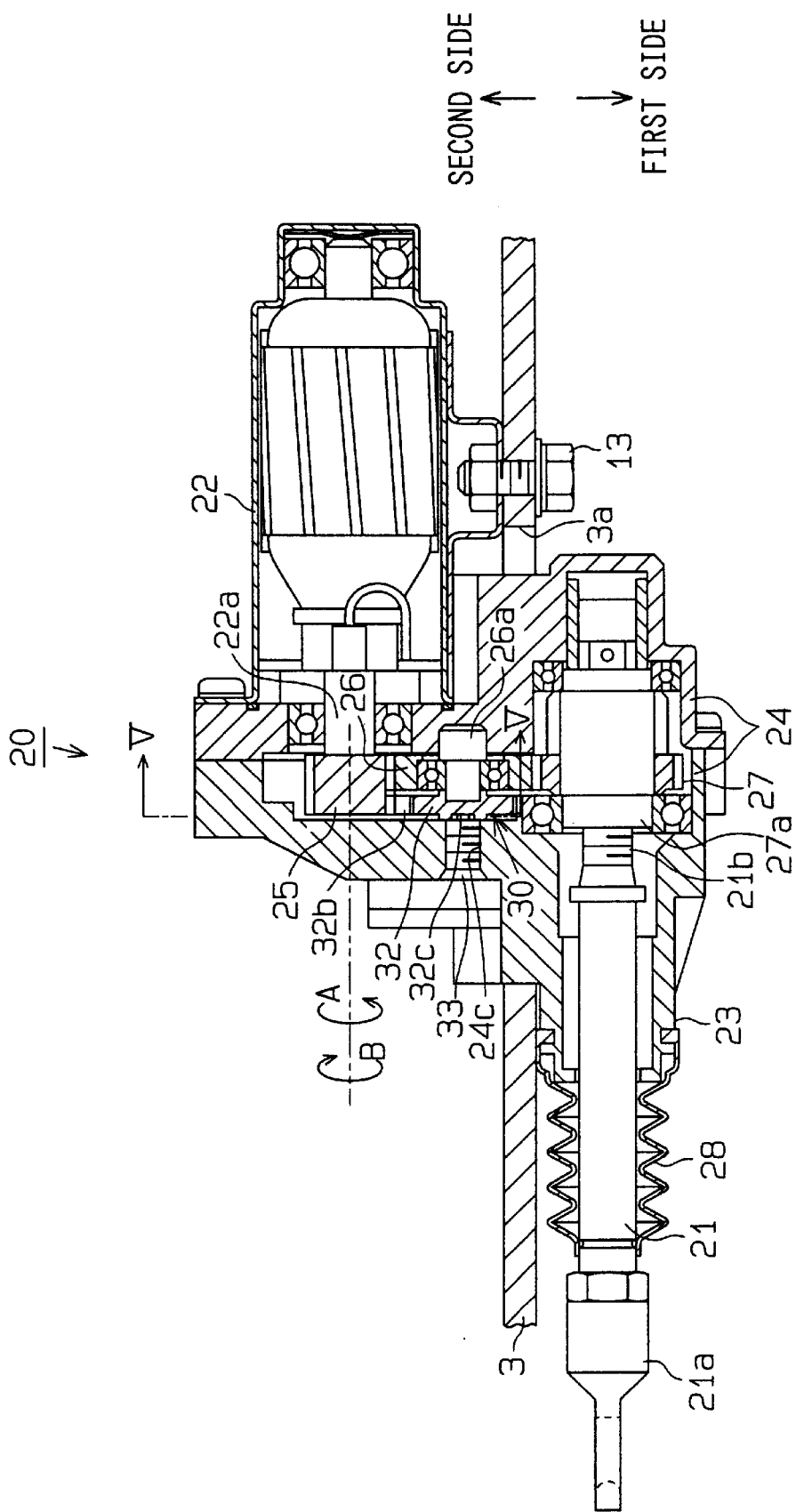
FIG. 2 is a cross-sectional view along line II—II in FIG. 1, showing an actuator.
Figure 3:
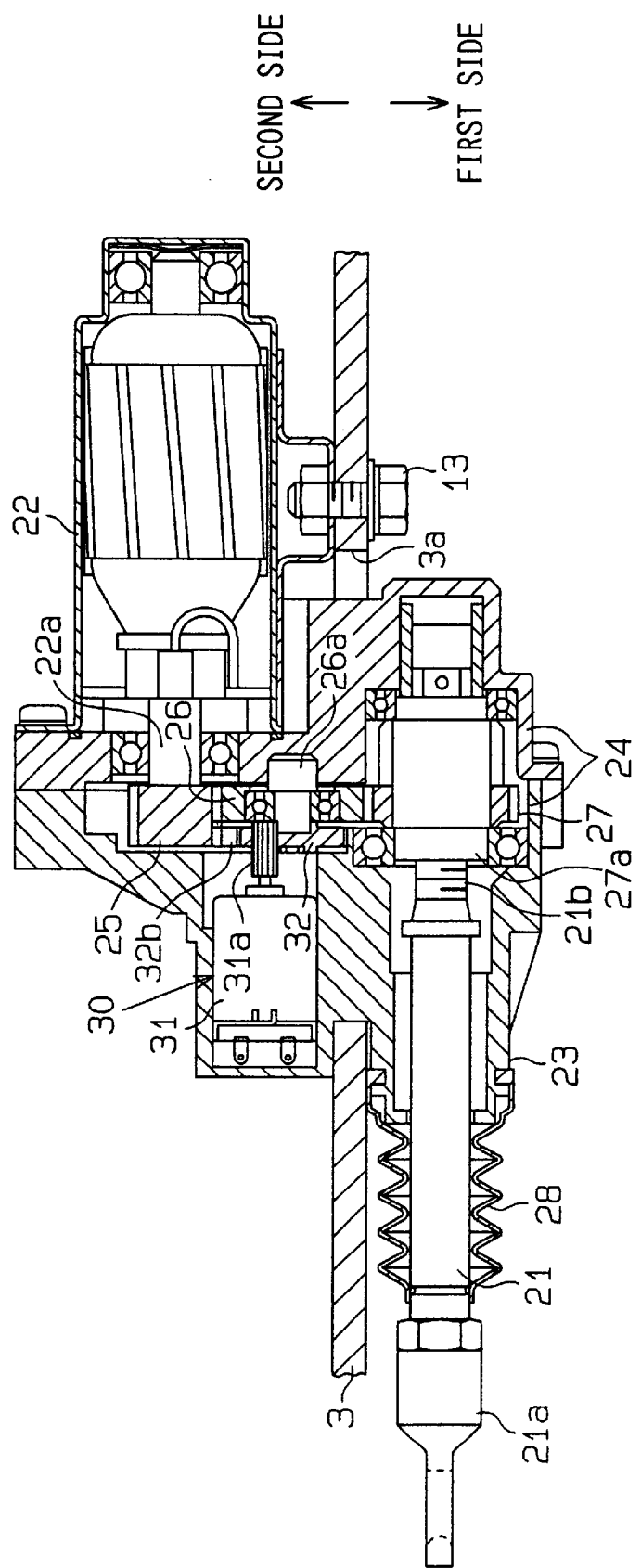
FIG. 3 is a cross-sectional view similar to FIG. 2, additionally showing a switching motor of the actuator.

A first end (located at the top side in FIG. 1) of the operation lever 10 is connected to an operation shaft 21 that is actuated by the actuator 20. The actuator 20 is received in a through hole 3a that penetrates through the back plate 3 in the following manner. That is, a brake actuation unit 23 of the actuator 20 (to be described later) is inserted through the through hole 3a of the back plate 3 from a second side (opposite side of the back plate 3 with respect to the drum 2) of the back plate to a first side (side where the drum 2 is located) of the back plate 3, so that the brake actuation unit 23 is located on the first side of the back plate 3 while a driving motor 22 of the actuator 20 (to be described later) is located on the second side of the back plate 3, as shown in FIGS. 2 and 3. Thereafter, the actuator 20 is secured to the back plate 3 with bolts 13 at a plurality of positions (only three of them are shown in FIG. 1). The position of the operation shaft 21 show n in FIG. I is the fully extended position (home position) where no braking operation is conducted.

When the braking operation is conducted, the actuator 20 is driven such that the operation shaft 21 is moved from the home position to a retracted position (toward the right side in FIG. 1). Thus, the operation lever 10 is pivoted about the connecting pin 11 in a clockwise direction in FIG. 1, and the operation lever 10 is also pivoted about the first end portion 12a of the connection bar 12 in the clockwise direction. As a result, the second end portion of each brake shoe 4 or 5 swings radially outward against the biasing force of the corresponding return spring 7 or 8.

Then, both the first and second brake shoes 4 and 5 engage the inner peripheral surface 2a of the drum 2, so that a frictional force is generated between the drum 2 and the first and second brake shoes 4, 5. Then, the brake shoes 4 and 5 are dragged by the drum 2 due to the frictional force and are rotated in the same rotational direction as the drum 2. For instance, if the drum 2 rotates in the counterclockwise direction in FIG. 1, the second end portion of the first brake shoe 4 is forced to abut the stable pin 9. That is, the second end of the first brake shoe 4 acts as a fixed end, so that both the first and second brake shoes 4 and 5 act as leading shoes. In this way, the brake device 1 generates a relatively large braking force.

With reference to FIG. 2, the actuator 20 includes the driving motor 22 acting as an electric driving means and the brake actuation unit 23 acting as a driving force transmitting means. The brake actuation unit 23 converts rotational motion of the driving motor 22 to linear reciprocal motion of the operation shaft 21.

Figure 4:
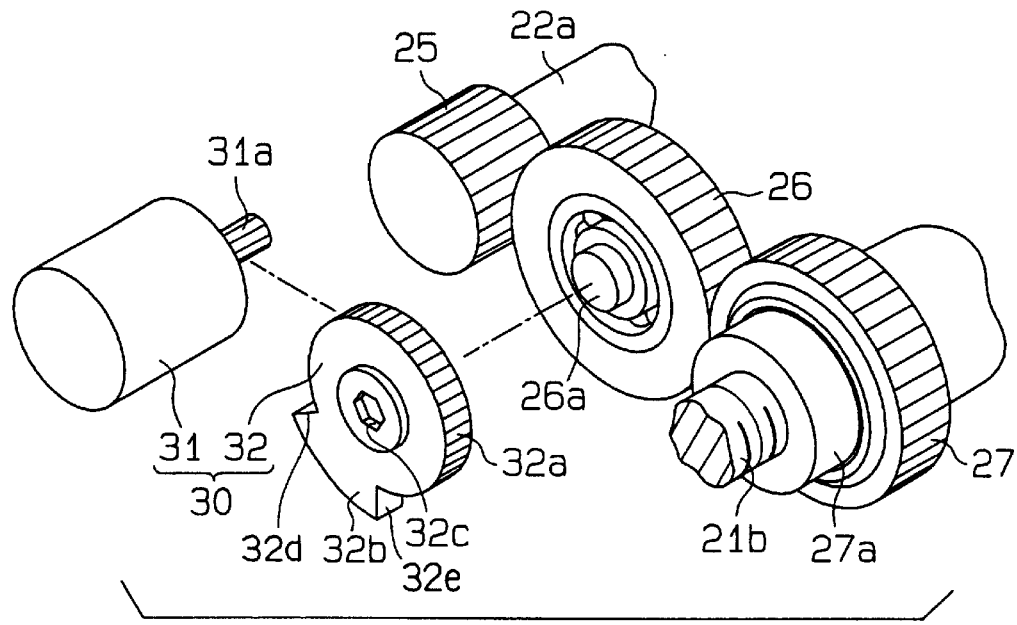
FIG. 4 is a perspective view showing a lock mechanism according to the embodiment of the present invention.

More particularly, the driving motor 22 is secured to a housing 24 of the brake actuation unit 23. The driving motor 22 and the housing 24 of the brake actuation unit 23 are secured to the back plate 3 with the bolts 13. In this embodiment, only one axial end of the driving motor 22 is supported by the housing 24 while the other axial end of the driving motor 22 is free. However, the driving motor 22 is directly securely connected to the back plate with the bolts 13, so that an increase in a vibration level (amplification of the vibration) in the driving motor 22 is effectively restrained. Thus, application of an excessive stress induced by the vibrations on the connection between the driving motor 22 and the housing 24 can be effectively prevented. As a result, rigidity of the driving motor 22 needs not be increased, avoiding an increase in a weight of the driving motor 22. A pinion 25 acting as a rotatable element is secured to a rotation shaft 22a of the driving motor 22, as best seen in FIG. 4. The pinion 25 is meshed with a first reduction gear 26 which is in turn meshed with a second reduction gear 27. The second reduction gear 27 has an output shaft portion 27a. The output shaft portion 27a of the second reduction gear 27 has a threaded hole (not shown) that extends in an axial direction of the second reduction gear 27.

The operation shaft 21 is received and supported within the housing 24 such that the operation shaft 21 is nonrotatable but is reciprocably movable in its axial direction. The operation shaft 21 has a connecting portion 21a at one end and a worm portion 21b at the other end. The connecting portion 21a of the operation shaft 21 is connected to the operation lever 10. The worm portion 21b is threadably engaged with the threaded hole of the output shaft portion 27a of the second reduction gear 27. A boot 28 is placed around the operation shaft 21 to seal the opening of the housing 24, so that intrusion of foreign matter into the housing 24 is effectively excluded.

Also, as shown in FIGS. 2 to 4, within the housing 24, there is provided a lock mechanism that locks and unlocks the pinion 25. When the pinion 25 is locked, free rotation of the output shaft portion 27a of the second gear 27 that is connected to the pinion 25 via the first reduction gear 26 is prevented. Thus, the output shaft portion 27a cannot be rotated by an external force transmitted thereto. The lock mechanism 30 is arranged on the second side of the back plate 3 along with the driving motor 22.

The lock mechanism 30 includes a switching motor 31 acting as an electric switching means and a regulation gear 32 acting as a regulating means as well as a rotation regulating means. The switching motor 31 is supported within the housing 24 and has a pinion 31a secured to its rotation shaft. The regulation gear 32 is freely rotatably supported by a shaft 26a to which the first reduction gear 26 is secured. That is, the regulation gear 32 does not rotate integrally with the first reduction gear 26.

Figure 5:
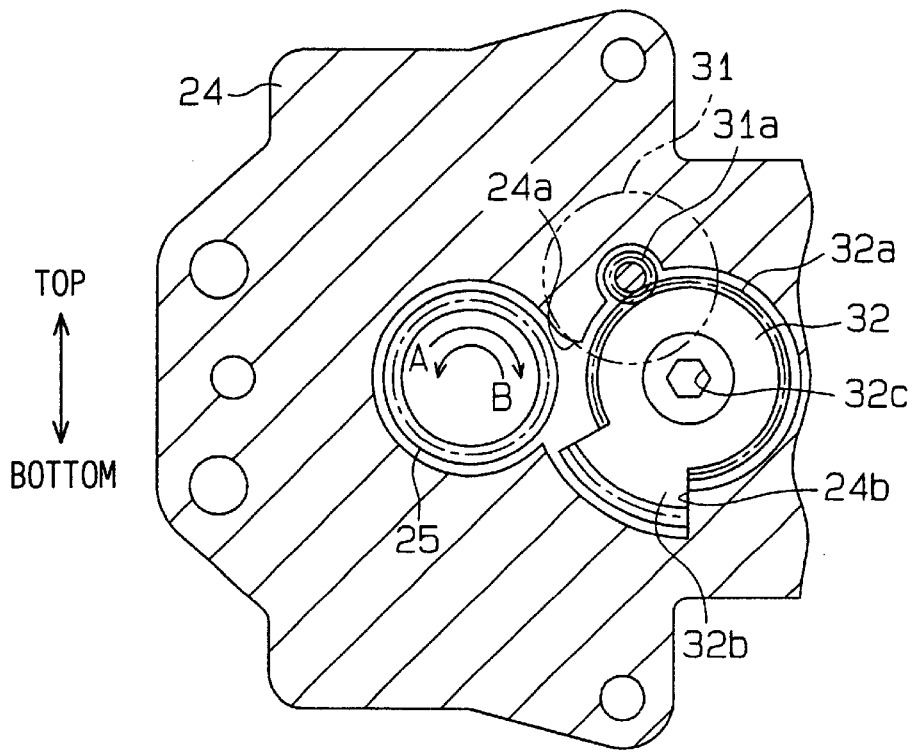
FIG. 5 is a cross-sectional view along line V—V in FIG. 2, showing a disengaged position of an regulation gear.
Figure 6:
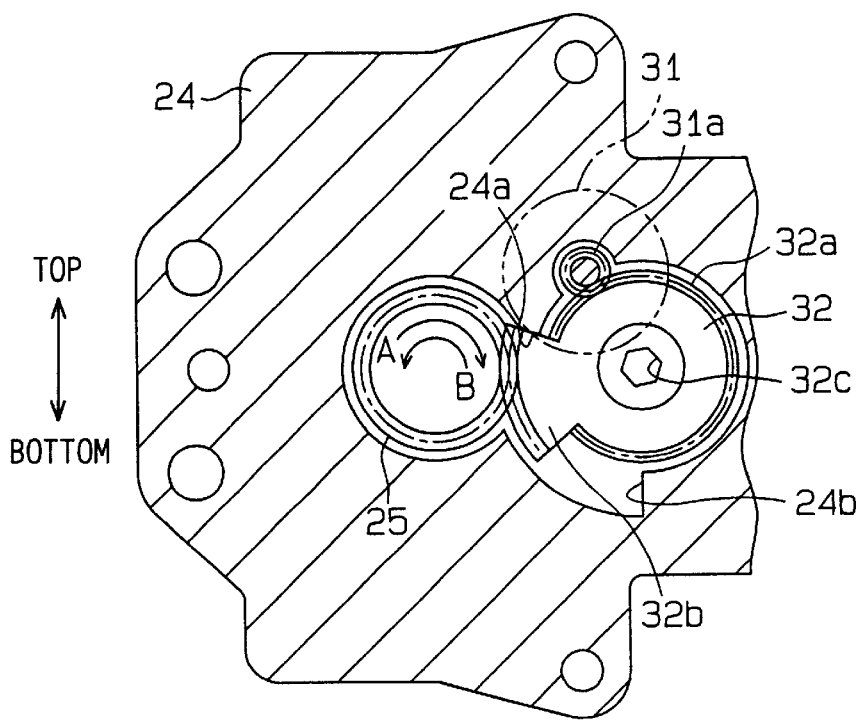
FIG. 6 is a cross-sectional view similar to FIG. 5, showing an engaged position of the regulation gear.

As shown in FIG. 4, the regulation gear 32 has a first engagement portion 32a to be meshed with the pinion 31a of the switching motor 31 and also has a second engagement portion 32b to be meshed with the pinion 25 of the driving motor 22. The second engagement portion 32b is arcuately protruded from the first engagement portion 32a in a radially outward direction. The regulation gear 32 is rotated by the force transmitted from the switching motor 31 through the pinion 31a. The rotation of the regulation gear 32 is limited within a predetermined rotational angle by first and second stop walls 24a and 24b formed in the housing 24, as shown in FIGS. 5 and 6. The regulation gear 32 is rotatable between an engaged position (FIG. 6) where the regulating gear 32 is engaged with the pinion 25 and a disengaged position (FIG. 5) where the regulating gear 32 is disengaged from the pinion 25. In the engaged position, the rotation of the regulation gear 32 is restricted by the first stop wall 24a, as shown in FIG. 6. In the disengaged position, the rotation of the regulation gear 32 is restricted by the second stop wall 24b, as shown in FIG. 5.

For the purposes of illustration, it will be temporarily assumed that the regulation gear 32 is positioned in the engaged position shown in FIG. 6. At this stage, if a rotational force is applied to the pinion 25 in the counterclockwise direction (direction of an arrow B), a first circumferential end surface 32d (FIG. 4) of the second engagement portion 32b engages the first stop wall 24a, so that the regulation gear 32 cannot be further rotated in the clockwise direction. That is, in this state, the rotation of the pinion 25 in the direction of the arrow B is prevented. This state is attained when a vehicle is parked, i.e., the parking brake is actuated.

When the regulation gear 32 is positioned in the disengaged position shown in FIG. 5, a small voltage (small holding voltage $V_{run}$ described in greater detail below) is continuously applied to the switching motor 31 to bias the second engagement portion 32b of the regulation gear 32 into the abutment with the second stop wall 24b of the housing 24, so that the regulation gear 32 is held in that position. This state is attained while the vehicle is running.

The lock mechanism 30 is positioned on the opposite side of a speed reducing mechanism that includes the pinion 25 and the first and second reduction gears 26, 27 with respect to the driving motor 22. The speed reducing mechanism is substantially positioned at an axial center of the actuator 20 (at the axial center of the secured portion of the actuator 20 that is secured with the bolts 13), so that the increase in the vibration (amplification of the vibration) of the lock mechanism 30 is effectively prevented. Thus, there is no need to provide a high rigidity in the corresponding portion of the housing 24 that receives the lock mechanism 30. Furthermore, erroneous actuation of the lock mechanism 30 by the vibrations is substantially eliminated.

As shown in FIG. 3, the portion of the housing 24 that receives the switching motor 31 is engaged with the back plate 3. Thus, although the application of the holding voltage $V_{run}$ to the switching motor 31 causes generation of some heat, the heat can be dissipated through the housing 24 and the back plate 3. Also, the switching motor 31 and the driving motor 22 are located on the opposing sides of the speed reducing mechanism, respectively. Thus, the heat generated during activation of each motor 31 or 22 is not easily transmitted to the other one. As a result, high performance (rotational performance) of each motor 31 or 22 is always maintained.

Furthermore, the switching motor 31 is positioned on the opposite side of the back plate 3 with respect to the brake shoes 4, 5 (drum 2). That is, the back plate 3 separates the switching motor 31 from the brake shoes 4, 5, which generate frictional heat during application of the brakes. As a result, the heat generated from the brake shoes 4 and 5 is not easily conducted to the switching motor 31, reducing a risk of thermal damage of the switching motor 31.

Furthermore, the switching motor 31 is positioned radially inward of the driving motor 22, such that the switching motor 31 is more distant from the brake shoes 4 and 5 than is the driving motor 22. That is, the switching motor 31, which generates the heat during running of the vehicle, is positioned apart from the driving motor 22 and the brake shoes 4 and 5, which generate the heat during the brake application, avoiding concentration of heat sources in the brake device 1.

On the opposite side of the regulation gear 32 with respect to the first reduction gear 26, there is provided a tool engaging recess 32c of a generally hexagonal shape to which a tool (not shown), such as an Allen wrench, is engaged, best seen in FIG. 4. Also, as shown in FIG. 2, an access hole 24c is formed through the housing 24. The access hole 24c is communicated to the regulation gear 32 to permit access to the regulation gear 32 (tool engaging recess 32c). The access hole 24c is a threaded hole into which a bolt 33 is threaded. A distal end of the bolt 33 substantially abuts the regulation gear 32 and receives a thrust load of the regulation gear 32.

Figure 7:
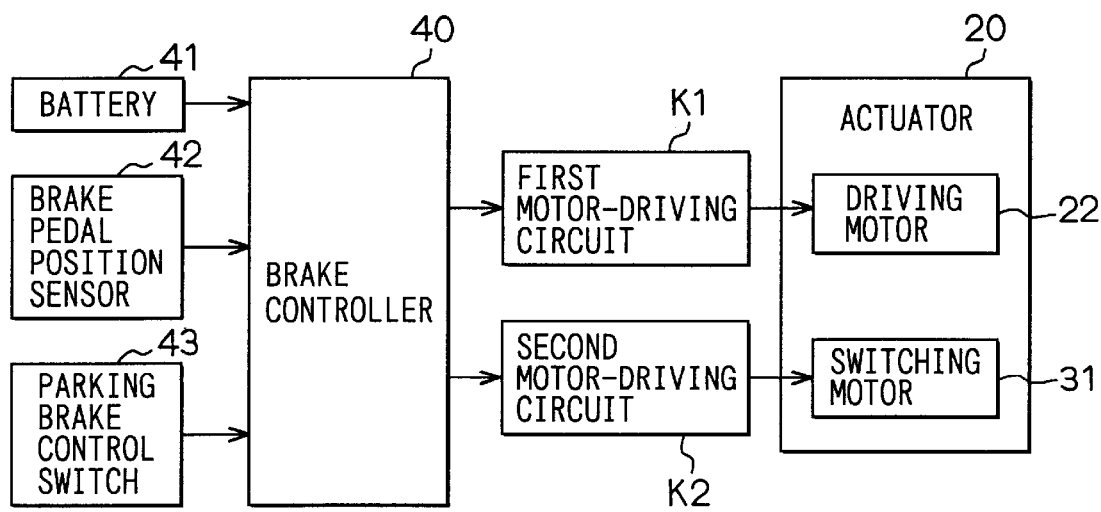
FIG. 7 is a schematic view showing an electrical arrangement of the brake device.

FIG. 7 indicates an electrical arrangement for driving the brake device 1. The brake device 1 is controlled by a brake controller 40 that is provided in the vehicle and is powered from a vehicle battery 41.

The controller 40 is connected to a brake pedal position sensor 42 from which a brake pedal position signal is outputted to the controller 40.

Furthermore, the controller 40 is connected to the parking brake control switch 43. The parking brake control switch 43 outputs an on/off signal based on an operation state of a parking brake lever provided on the vehicle. Then, this on/off signal is fed to the brake controller 40. That is, when the parking brake lever is positioned to a parking brake application position, the parking brake control switch 43 outputs an on signal (parking brake application signal) which is then fed to the brake controller 40. On the other hand, if the parking brake lever is positioned to a parking brake release position, the parking brake control switch 43 outputs an off signal (parking brake release signal) to the brake controller 40. Then, the controller 40 is changed to "a normal brake mode" or "a parking brake mode" based on the on/off signal fed from the parking brake control switch 43. More specifically, the controller 40 is in "the parking brake mode" when the on signal (parking brake application signal) is outputted from the parking brake control switch 43. Furthermore, the controller 40 is in "the normal brake mode" when the off signal is outputted from the parking brake control switch 43.

In the normal brake mode, the brake controller 40 drives the driving motor 22 and the switching motor 31 through a first motor-driving circuit K1 and a second motor-driving circuit K2, respectively, based on the parking brake release signal and the brake pedal position signal. In the parking brake mode, the brake controller 40 drives the switching motor 31 through the second motor-driving circuit K2 based on the parking brake application signal. The normal brake mode and the parking brake mode will be described in greater detail below.

(Normal Brake Mode)

In the normal brake mode, the controller 40 drives the switching motor 31 through the second motor-driving circuit K2 to rotate the regulation gear 32 to the disengaged position shown in FIG. 5, permitting rotation of the driving motor 22. Furthermore, the controller 40 applies a small voltage (small holding voltage $V_{run}$) to the switching motor 31 to holds the regulation gear 32 in the disengaged position.

When the brake pedal is depressed or moved in an applying direction, the controller 40 rotates the driving motor 22 in a direction of an arrow A shown in FIGS. 5 and 6 to rotate the output shaft portion 27a through the pinion 25 and the first and second gears 26, 27, so that the operation shaft 21 is retracted. Thus, the brake shoes 4 and 5 are pivoted radially outwardly through the operation lever 10 against the biasing forces of the springs 7, 8 to engage the inner peripheral surface 2a of the drum 2. As the brake pedal is depressed further, the brake shoes 4 and 5 are more strongly biased against the inner peripheral surface 2a of the drum 2, resulting in an increase in the braking force of the brake device 1.

On the other hand, when the brake pedal is moved in a releasing direction opposite to the applying direction, the controller 40 rotates the driving motor 22 in the direction of the arrow B shown in FIGS. 5 and 6 to rotate the output shaft portion 27a, so that the operation shaft 21 is extended to push the operation lever 10. This movement of the operation lever 10 allows the brake shoes 4 and 5 to be pulled toward the stable pin 9 by the corresponding springs 7 and 8. Thus, each one of the brake shoes 4 and 5 moves in a direction away from the inner peripheral surface 2a of the drum 2. As a result, the braking force of the brake device 1 is reduced.

As described above, the controller 40 drives the driving motor 22 through the first motor-driving circuit K1 based on the brake pedal position signal to engage or disengage the brake shoes 4 and 5 relative to the inner peripheral surface 2a of the brake drum 2. This operation allows a linear change in the biasing force for biasing the brake shoes 4 and 5 against the inner peripheral surface 2a of the brake drum 2, so that the braking force of the brake device 1 is linearly controlled.

(Parking Brake Mode)

In the parking brake mode, the controller 40 rotates the driving motor 22 in the direction of the arrow A until the biasing force (braking force) that biases the brake shoes 4, 5 against the inner peripheral surface 2b of the brake drum 2 reaches a predetermined value, i.e., a value required for parking the vehicle.

Then, the controller 40 rotates the switching motor 31 through the second motor-driving circuit K2 to rotate the regulation gear 32 in the clockwise direction in FIG. 5. Thus, the regulation gear 32 is positioned in the engaged position where the second engagement portion 32b of the regulation gear 32 is meshed with the pinion 25, as shown in FIG. 6. At this stage, the first circumferential end surface 32d of the second engagement portion 32b abuts the first stop wall 24a. As a result, the rotation of the driving motor 22 (pinion 25) in the direction of the arrow B is prevented. Then, the controller 40 turns off the power to the switching motor 31.

At this stage, a reaction force is continuously applied on the brake shoes 4 and 5 in a direction away from the inner peripheral surface 2a of the brake drum 2. This reaction force is transmitted to the operation shaft 21 through the operation lever 10, so that the operation shaft 21 continuously receives the reaction force in an axial direction away from the housing 24 (toward the left side in FIG. 1). Then, the reaction force is transmitted to the driving motor 22 (pinion 25) through the output shaft portion 27a and the first and second reduction gears 27, 26, exerting a rotational force on the driving motor 22 (pinion 25) in the direction of the arrow B. However, the rotation of the driving motor 22 (pinion 25) in the direction of the arrow B is prevented by the lock mechanism 30 as described above, so that the output shaft portion 27a cannot be rotated. As a result, the operation shaft 21 cannot move in the axial direction away from the housing 24 (toward the left side in FIG. 1), SO that the brake device 1 is maintained to apply the braking force required for parking.

At this point, the rotational force is continuously applied to the driving motor 22 (pinion 25) in the direction of the arrow B. This rotational force is transmitted to the second engagement portion 32b of the regulation gear 32, so that the first circumferential end surface 32d of the second engagement portion 32b is continuously biased against the first stopping wall 24a of the housing 24. As a result, upon turning off the power to the switching motor 31, the regulation gear 32 is still continuously biased into the engaged position by the reaction force, so that the regulation gear 32 is continuously meshed with the pinion 25.

Upon receiving the parking brake release signal, the controller 40 is changed to the normal brake mode. Thus, the controller 40 slightly rotates the driving motor 22 in the direction of the arrow A through the first motor-driving circuit K1, increasing the biasing force that biases the brake shoes 4 and 5 against the inner peripheral surface 2a of the drum 2. This slight rotation of the driving motor 22 is conducted to disengage the second engagement portion 32b of the regulation gear 32 from the pinion 25.

Then, the controller 40 rotates the switching motor 31 through the second motor-driving circuit K2 to place the regulation gear 32 in the disengaged position (FIG. 5) where the second engagement portion 32b of the regulation gear 32 is disengaged from the pinion 25. Thereafter, the controller 40 continuously applies the small voltage (small holding voltage $V_{run}$) to the switching motor 31. At this stage, if the brake pedal is not depressed, the controller 40 rotates the driving motor 22 in the direction of the arrow B to move the brake shoes 4, 5 away from the inner peripheral surface 2b of the brake drum 2. Thus, the brake device 1 is returned to the state where the above-described normal brake actuation is possible.

Upon application of the parking brake, if the driving motor 22 and the switching motor 31 are failed, or if the battery 41 is completely discharged, the second engagement portion 32b of the regulation gear 32 can be manually disengaged from the pinion 25. More specifically, the bolt 33 shown in FIG. 2 is threaded out of the access hole 24c. Then, the tool, such as the Allen wrench (not shown), is inserted into the access hole 24c and is engaged with the tool engaging recess 32c. Thereafter, the regulation gear 32 is rotated with the tool from the engaged position to the disengaged position. Thus, the driving motor 22 (pinion 25) is disengaged and is now freely rotatable. Then, the driving motor 22 is rotated by the reaction forces of the brake shoes 4 and 5 that act in the direction away from the inner circumferential surface 2a of the brake drum 2, so that the parking brake is released.

Figure 8:
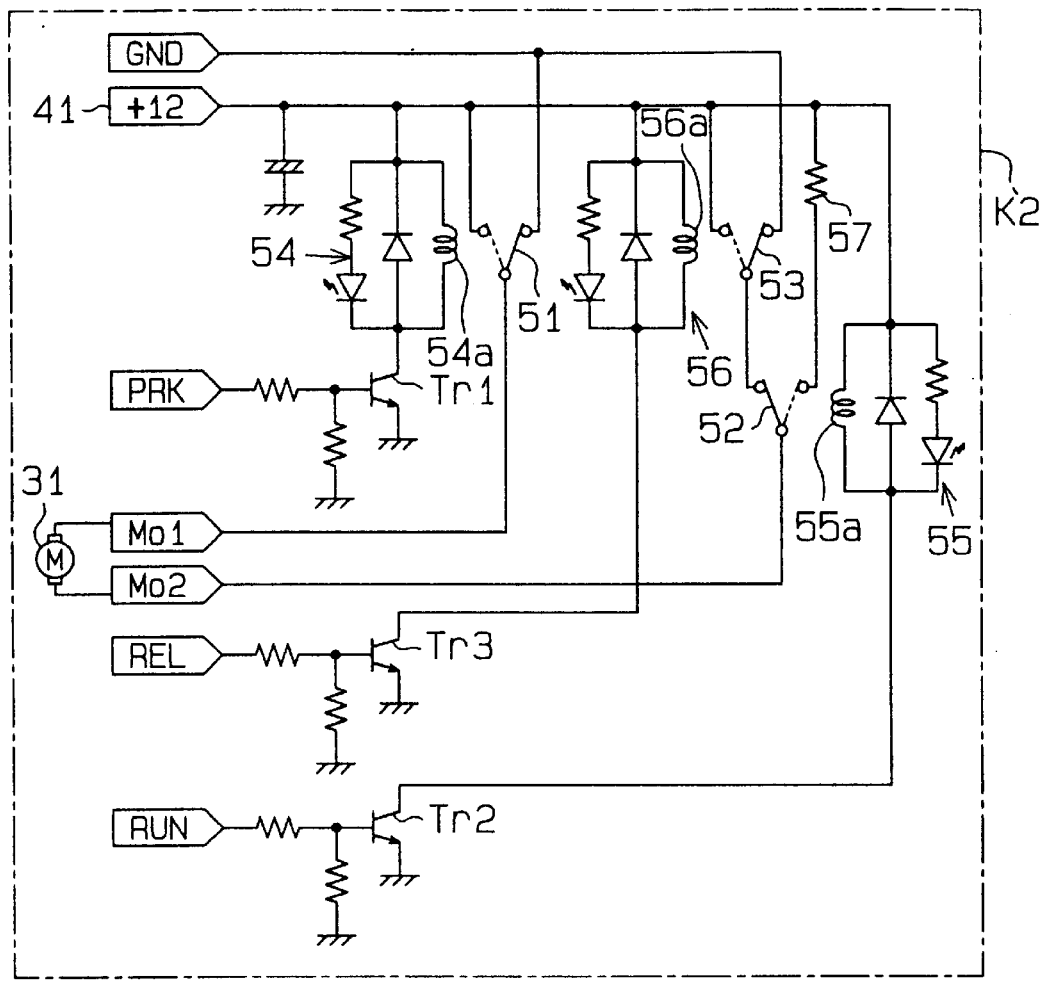
FIG. 8 is a circuit diagram showing a motor-driving circuit of a switching motor according to the embodiment of the present invention.

In the present embodiment, the controller 40 supplies the power to the switching motor 31 through the second motor-driving circuit K2 shown in FIG. 8.

More specifically, as shown in FIG. 8, the switching motor 31 includes a first motor terminal Mo1 and a second motor terminal Mo2. The first motor terminal Mo1 is connectable to the battery 41 or a ground through a first relay switch 51.

The second motor terminal Mo2 is connectable to the battery 41 or the ground through the second and third relay switches 52 and 53. That is, the second motor terminal Mo2 is connectable to the battery 41 or the ground through one of the following three different paths: through the second relay switch 52 and the resistor 57 to the battery 41; through the second relay switch 52 and the third relay switch 53 to the battery 41; and through the second relay switch 52 and the third relay switch 53 to the ground.

The first relay switch 51 is switched by energization and deenergization of a relay coil 54a of a first relay circuit 54. When the relay coil 54a is energized, the relay coil 54a shifts the first relay switch 51 to connect the first motor terminal Mo1 to the battery 41, as indicated by a dotted line in FIG. 8.

When the relay coil 54a is deenergized, the relay coil 54a shifts the first relay switch 51 to connect the first motor terminal Mo1 to the ground, as indicated by a solid line in FIG. 8.

The energization and deenergization of the relay coil 54a of the first relay circuit 54 are controlled by an on signal and an off signal, respectively, fed to the parking brake application control terminal PRK from the brake controller 40. That is, if the on signal is fed to the parking brake application control terminal PRK, the first transistor Tr1 is turned on. When the first transistor Tr1 is turned on, the voltage of the battery 41 is applied to the first relay circuit 54, so that the relay coil 54a is energized. If the off signal is fed to the parking brake application control terminal PRK, the first transistor Tr1 is turned off. When the first transistor Tr1 is turned off, the voltage of the battery 41 is not applied to the first relay circuit 54, so that the relay coil 54a is deenergized.

The second relay switch 52 is switched by energization and deenergization of a relay coil 55a of a second relay circuit 55. When the relay coil 55a is energized, the relay coil 55a shifts the second relay switch 52 to connect the second motor terminal Mo2 to the battery 41 through a resistor 57, as indicated by a dotted line in FIG. 8. When the relay coil 55a is deenergized, the relay coil 55a shifts the second relay switch 52 to connect the second motor terminal Mo2 to the third relay switch 53, as indicated by a solid line in FIG. 8.

The energization and deenergization of the relay coil 55a of the second relay circuit 55 are controlled by an on signal and an off signal fed to the running control terminal RUN from the brake controller 40. That is, if the on signal is fed to the running control terminal RUN, the second transistor Tr2 is turned on. When the second transistor Tr2 is turned on, the voltage of the battery 41 is applied to the second relay circuit 55, so that the relay coil 55a is energized. If the off signal is fed to the running control terminal RUN, the second transistor Tr2 is turned off. When the second transistor Tr2 is turned off, the voltage of the battery 41 is not applied to the second relay circuit 55, so that the relay coil 55a is deenergized.

The third relay switch 53 is switched by energization and deenergization of a relay coil 56a of a third relay circuit 56. When the relay coil 56a is energized, the relay coil 56a shifts the third relay switch 53 to connect the second relay switch 52 to the battery 41, as indicated by a dotted line in FIG. 8. When the relay coil 56a is deenergized, the relay coil 56a shifts the third relay switch 53 to connect the second relay switch 52 to the ground, as indicated by a solid line in FIG. 8.

The energization and deenergization of the relay coil 56a of the third relay circuit 56 are controlled by an on signal and an off signal fed to the parking brake release control terminal REL from the brake controller 40. That is, if the on signal is fed to the parking brake release control terminal REL, the third transistor Tr3 is turned on. When the third transistor Tr3 is turned on, the voltage of the battery 41 is applied to the third relay circuit 56, so that the relay coil 56a is energized. If the off signal is fed to the parking brake release control terminal REL, the third transistor Tr3 is turned off. When the third transistor Tr3 is turned off, the voltage of the battery 41 is not applied to the third relay circuit 56, so that the relay coil 56a is deenergized.

In the parking brake application operation, as described above, the driving motor 22 is rotated until the braking force required for parking the vehicle is generated. Once the required braking force is achieved, the on signal is fed to the parking brake application control terminal PRK, and the off signal is fed to both the running control terminal RUN and the parking brake release control terminal REL. Thus, the first motor terminal Mo1 is connected to the battery 41, and the second motor terminal Mo2 is connected to the ground. Thus, the switching motor 31 rotates forward to rotate the regulation gear 32 in the clockwise direction in FIG. 5 to position the regulation gear 32 into the engaged position where the regulation gear 32 is engaged with the pinion 25, as shown in FIG. 6. Thereafter, as described above, the regulation gear 32 is tightly meshed with the pinion due to the reaction force transmitted from the brake shoes 4 and 5, and the off signal is fed to the parking brake application control terminal PRK to turn off the power to the switching motor 31. That is, the unnecessary use of the battery power is prevented upon application of the parking brake.

In the parking brake release operation, as described above, the driving motor 22 is slightly rotated such that the braking force is slightly increased to disengage the regulation gear 32 from the pinion 25 against the reaction force of the brake shoes 4 and 5. The n, the on signal is fed to the parking brake release control terminal REL, and the off signal is fed to both the running control terminal RUN and the parking brake application control terminal PRK. Thus, the first motor terminal Mo1 is connected to the ground, and the second motor terminal Mo2 is connected to the battery 41. As a result, the switching motor 31 rotates backward, so that the regulation gear 32 rotates in the counterclockwise direction in FIG. 6 to position the regulation gear 32 in the disengaged position where the regulation gear 32 is disengaged from the pinion 25, as shown in FIG. 5.

Figure 9:
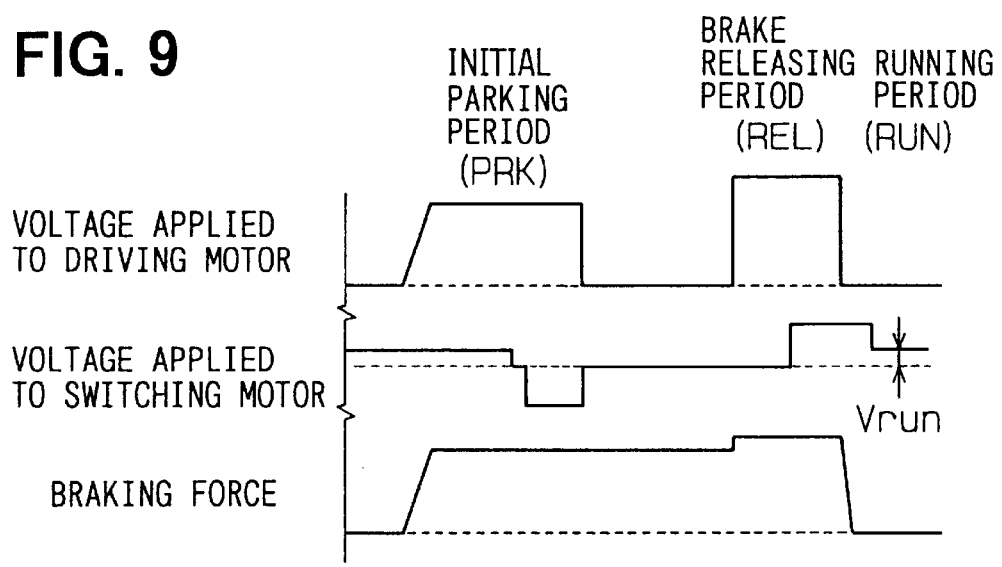
FIG. 9 is a descriptive view showing a relationship between a voltage applied to the switching motor and a braking force of the brake device.

After the parking brake is released in the manner described above, the following operation is conducted to allow running of the vehicle. That is, the on signal is fed to the running control terminal RUN, and the off signal is fed to both the parking brake release control terminal REL and the parking brake application terminal PRK. Thus, the first motor terminal Mo1 is connected to the ground, and the second motor terminal Mo2 is connected to the battery 41 through the resistor 57. As a result, the s mall holding voltage $V_{run}$ that is reduced by the amount corresponding to the voltage drop in the resistor 57 is applied to the switching motor 31, as shown in FIG. 9. As a result, the switching motor 31 is rotated backward, so that the regulation gear 32 is biased in the counterclockwise direction by the switching motor 31. Thus, the regulation gear 32 is biased against the second stop wall 24b of the housing 24, as shown in PIG. 5, to continuously hold the regulation gear 32 in the disengaged position where the regulation gear 32 is disengaged from the pinion 25. That is, as long as the vehicle is running, the small holding voltage $V_{run}$ is continuously applied to the switching motor 31, as shown in FIG. 9, to continuously hold the regulation gear 32 in place. The small holding voltage $V_{run}$ is chosen to be relatively small, but enough to keep the regulation gear 32 biased into abutment with the second stop wall 24b of the housing 24, so that the regulation gear 32 is prevented from the engagement with the pinion 25 upon application of vibrations or shocks encountered during running of the vehicle.

The present embodiment provides the following characteristic advantages.

(1) In the above embodiment, while the vehicle is running, the small holding voltage $V_{run}$ is continuously applied to the switching motor 31 to continuously hold the regulation gear 32 in the disengaged position where the regulation gear 32 is disengaged from the pinion 25. As a result, the regulation gear 32 is reliably prevented from the engagement with the pinion 25 upon application of the vibrations or shocks that are typically encountered during running of the vehicle. Also, in the above embodiment, there is no need to provide a limiting member, such as an engagement pin, a resilient or elastic member or the like, that limits the rotation of the regulation gear 32 to prevent the engagement of the regulation gear 32 with the pinion 25 during running of the vehicle. Thus, the number of parts that constitute the actuator 20 can be reduced. Furthermore, although the small holding voltage $V_{run}$ is continuously applied to the switching motor 31, the battery 41 is continuously recharged during running of the vehicle. As a result, the application of the small holding voltage $V_{run}$ will not substantially reduce the remaining battery charge. Furthermore, if in fact the limiting member is provided in the rotational path of the regulation gear 32 to limit the rotation of the regulation gear 32 to prevent the engagement of the regulation gear 32 with the pinion 25 during running of the vehicle, the regulation gear 32 is required to overcome the limiting force of the limiting member before the regulation gear 32 disengages from the pinion 25. In such a case, the switching motor 31 is required to have a higher output torque to overcome the limiting force of the limiting member. However, according to the present embodiment, there is no such a limiting member, so that the output torque of the switching motor 31 can be reduced. Thus, the switching motor 31 can be smaller, lighter and less costly.

(2) In the above embodiment, the holding voltage $V_{run}$ is chosen to be relatively small, but enough to keep the regulation gear 32 biased into abutment with the second stop wall 24b of the housing 24, so that the regulation gear 32 is prevented from the engagement with the pinion 25 upon application of the vibrations or the shocks encountered during running of the vehicle. Thus, the electric current supplied to the switching motor 31 is reduced, so that disadvantageous incidents, such as heating up of the switching motor 31 after a relatively long period of operation time, can be avoided. Furthermore, by monitoring the holding voltage $V_{run}$, it is possible to detect disconnection, failure or other similar problems of the switching motor 31 through the controller 40.

(3) In the above embodiment, it is only required to further provide the appropriate operating method of the switching motor 31 in order to prevent the engagement of the regulation gear 32 with the pinion 25 upon application of the vibrations or the shocks encountered during running of the vehicle. Thus, there is no need to further provide a mechanical arrangement to prevent the engagement of the regulation gear 32 with the pinion 25, so that it is possible to reduce the costs and the size of the actuator 20.

(4) In the above embodiment, the switching motor 31 is positioned on the opposite side of the speed reducing mechanism including the pinion 25 and the first and second reduction gears 26, 27 with respect to the driving motor 22. In this way, the heat generated from the switching motor 31 during running of the vehicle is not easily transmitted to the driving motor 22 that is positioned on the opposite side of the speed reducing mechanism with respect to the switching motor 31. Thus, high performance (high rotational performance) of the driving motor 22 can be maintained. As a result, an erroneous operation of the driving motor 22 can be prevented.

(5) In the above embodiment, the switching motor 31 is positioned radially inward of the driving motor 22, such that the switching motor 31 is more distant from the brake shoes 4 and 5 than is the driving motor 22. That is, the switching motor 31, which generates the heat during driving of the vehicle, is positioned apart from the driving motor 22 and the brake shoes 4 and 5, which generate the heat during the brake application. Thus, concentration of the heat sources within the braked device 1 is advantageously avoided.

(6) In the above embodiment, the switching motor 31 is arranged on the opposite side (second side shown in FIG. 3) of the back plate 3 with respect to the brake shoes 4 and 5 (first side shown in FIG. 3). In this way, the frictional heat generated from the brake shoes 4 and 5 during the brake application is not easily transmitted to the switching motor 31. Thus, the thermal damage of the switching motor 31 can be avoided.

(7) In the above embodiment, the portion of the housing 24 that receives the switching motor 31 is arranged to contact the back plate 3. Thus, the heat generated from the switching motor 31 during running of the vehicle can be well dissipate through the back plate 3. Thus, high performance (high rotational performance) of the switching motor 31 can be maintained. As a result, an erroneous operation of the switching motor 31 can be prevented. Also, because of the effective heat dissipation through the back plate 3, the heat generated from the switching motor 31 is not easily transmitted to the driving motor 22. Thus, high performance (high rotational performance) of the driving motor 22 can be maintained. As a result, an erroneous operation of the driving motor 22 can be prevented.

(8) In the above embodiment, the switching motor 31, i.e., the electric motor is used in the lock mechanism 30. Thus, it is possible to achieve the simple structure of the lock mechanism 30.

The above embodiment can be modified as follows.

Figure 10:
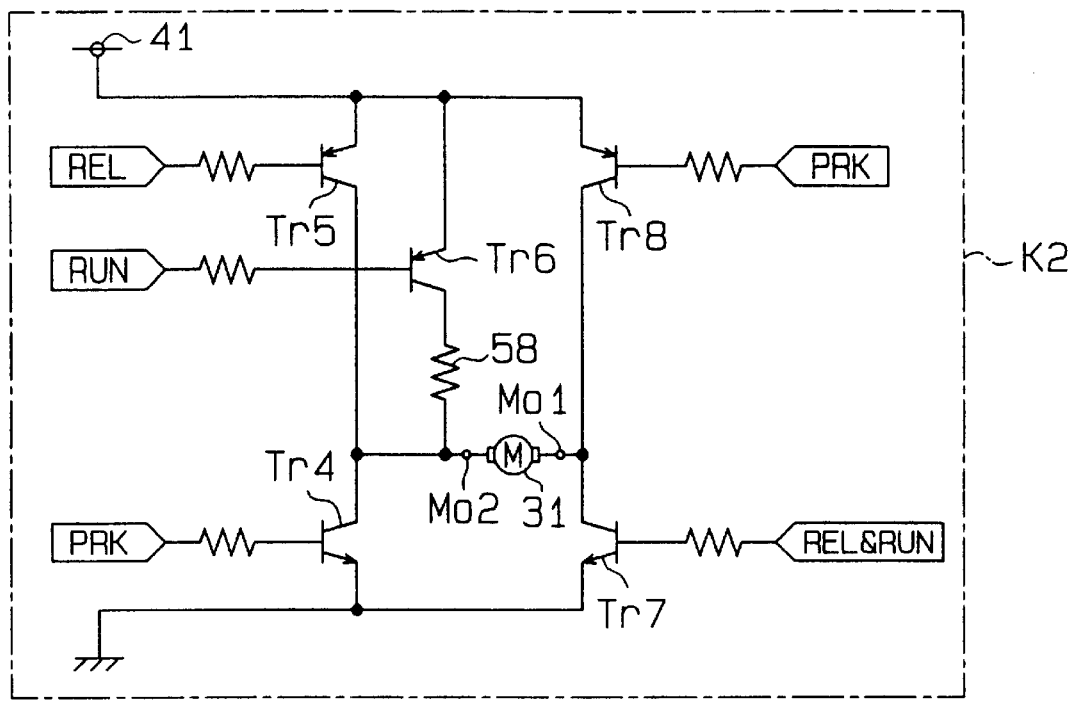
FIG. 10 is a circuit diagram showing a modification of the motor-driving circuit of the switching motor according to the embodiment of the present invention.

The second motor-driving circuit K2 can be modified as shown in FIG. 10. More specifically, as shown in FIG. 10, the second motor terminal Mo2 of the switching motor 31 is connectable to the ground through a fourth transistor Tr4 and is also connectable to the battery 41 through a fifth transistor Tr5 or a sixth transistor Tr6 and a resistor 58. The first motor terminal Mo1 of the switching motor 31 is connectable to the ground through a seventh transistor Tr7 and is also connectable to the battery 41 through an eighth transistor Tr8. That is, in the driving circuit K2 shown in FIG. 10, the relay switches 51 to 53 and the relay circuits 53 to 55 shown in FIG. 8 are omitted.

During the parking period, the on signal is fed to the parking brake application control terminal PRK, and the off signal is fed to both the running control terminal RUN and the parking brake release control terminal REL. Thus, the fourth transistor Tr4 and the eighth transistor Tr8 are turned on. As a result, the first motor terminal Mo1 is connected to the battery 41 through the eighth transistor Tr8, and the second motor terminal Mo2 is connected to the ground through the fourth transistor Tr4. This results in the forward rotation of the switching motor 31, causing the regulation gear 32 to be rotated in the clockwise direction in FIG. 5. Thus, the regulation gear 32 is positioned in the engaged position where the regulation gear 32 is engaged with the pinion 25, as shown in FIG. 6. This state is maintained until the parking brake is released.

During the parking brake releasing period, the on signal is fed to the parking brake release control terminal REL, and the off signal is fed to both the running control terminal RUN and the parking brake application control terminal PRK. Thus, the fifth transistor Tr5 and the seventh transistor Tr7 are turned on. As a result, the first motor terminal Mo1 is connected to the ground through the seventh transistor Tr7, and the second motor terminal Mo2 is connected to the battery 41 through the fifth transistor Tr5. This results in the backward rotation of the switching motor 31, causing the regulation gear 32 to be rotated in the counterclockwise direction in FIG. 6. Thus, the regulation gear 32 is positioned in the disengaged position where the regulation gear 32 is disengaged from the pinion 25, as shown in FIG. 5.

During the running period of the vehicle upon releasing of the parking brake, the on signal is fed to the running control terminal RUN, and the off signal is fed to both the parking brake release control terminal REL and the parking brake application control terminal PRK. Thus, the sixth transistor Tr6 and the seventh transistor Tr7 are turned on. As a result, the first motor terminal Mo1 is connected to the ground through the seventh transistor Tr7, and the second motor terminal Mo2 is connected to the battery 41 through the resistor 58 and the sixth transistor Tr6. Thus, the holding voltage $V_{run}$ that is reduced by the amount corresponding to the voltage drop in the resistor 58 is applied to the switching motor 31, as shown in FIG. 9. This results in the backward rotation of the switching motor 31, causing the regulation gear 32 to be biased into the counterclockwise direction in FIG. 6. Thus, the regulation gear 32 is urged against the second stop wall 24b of the housing 24 and is held in the disengaged position where the regulation gear 32 is disengaged from the pinion 25. As long as the vehicle is running, the holding voltage $V_{run}$ is continuously applied to the switching motor 31 as shown in FIG. 9 to hold the regulation gear 32 in position.

Figure 11:
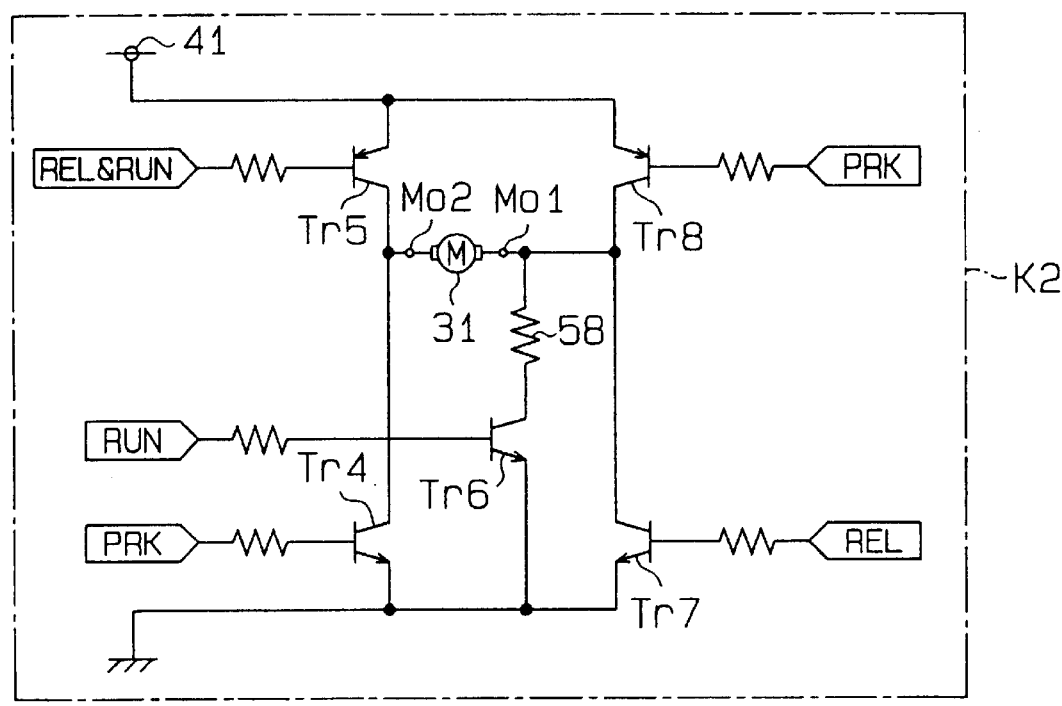
FIG. 11 is a circuit diagram showing another modification of the motor-driving circuit of the switching motor according to the embodiment of the present invention.

The second motor-driving circuit K2 can also be modified as shown in FIG. 11. That is, the second motor terminal Mo2 of the switching motor 31 is connectable to the ground through the fourth transistor Tr4 and is also connectable to the battery 41 through the fifth transistor Tr5. The first motor terminal Mo1 of the switching motor 31 is connectable to the battery 41 through the eighth transistor Tr8 and is also connectable to the ground through the seventh transistor Tr7 or the sixth transistor Tr6 and the resistor 58. With this construction, the results similar to those of the circuit K2 shown in FIG. 10 are achieved.

In place of the resistor 57 or 58, any other current limiter or a voltage limiting means can be provided.

While the electric current is applied to the switching motor 31 during running of the vehicle so as to hold the regulation gear 32 in the disengaged position where the regulation gear 32 is disengaged from the pinion 25, this electric current can be monitored by the controller 40 to check the disconnection or failure of the switching motor 31.

In the above embodiment, the regulation gear 32 is arranged to mesh with the pinion 25. Alternatively, the regulation gear 32 can be arranged to mesh with the other rotatable element, such as the first or second reduction gears 26 and 27. However, the pinion 25 applies the smaller load to the regulation gear 32 in comparison to the first and second reduction gears 26 and 27. Thus, if the regulation gear 32 is arranged to mesh with the pinion 25, the rigidity of the regulation gear 32 needs not be increased. Thus, the engagement of the regulation gear 32 with the pinion 25 is most preferred.

In the above embodiment, the motor 31 is used as the electric switching means. However, any other electric switching means can be used. For instance, an electromagnetic solenoid can be used as the electric switching means to move the regulation gear 32 between the engaged position where the regulation gear 32 is engaged with the pinion 25 and a disengaged position where the regulation gear 32 is disengaged from the pinion 25.

In the above embodiment, the driving motor 22 is used as the electric driving means. However, any other electric driving means can be used. For instance, an electromagnetic driving device that can provide a linear reciprocal motion can be used to reciprocally move the operation shaft 21 in the axial direction to actuate the brake shoes 4 and 5.

In the above embodiment, the present invention is embodied in the vehicular drum brake device 1. However, the present invention can also be embodied in a vehicular disc brake device.

Additional advantages and modifications will readily occur to those skilled in the art. The invention in its broader terms is therefore, not limited to the -specific details, representative apparatus, and illustrative examples shown and described.

What is claimed is:

1. An actuator for actuating a brake device, said brake device including a rotatable body and a friction member, said rotatable body being connected to an axle shaft of a vehicle and integrally rotating with said axle shaft, said friction member being movable between an engaged position where said friction member is biased into engagement with said rotatable body to apply a braking force against said rotatable body and a disengaged position where said friction member is disengaged from said rotatable body, said actuator comprising:

a driving motor that rotates forward and backward to generate a driving force to move said friction member between said engaged position and said disengaged position;

a driving force transmitting means for transmitting said driving force of said driving motor to said friction member, said driving force transmitting means including:

a rotatable element that rotates forward and backward as said driving motor rotates forward and backward, respectively; and an operation shaft that moves said friction member between said engaged position and said disengaged position based on said forward and backward rotation of said rotatable element, respectively;

a rotation regulating means that is movable between an engaged position where said rotation regulating means is engaged with said rotatable element and a disengaged position where said rotation regulating means is disengaged from said rotatable element, wherein:

while said rotation regulating means is in said engaged position, said rotation regulating means prevents at least one of forward and backward rotations of said rotatable element; and while said rotation regulating means is in said disengaged position, said rotation regulating means allows said at least one of said forward and backward rotations of said rotatable element; and an electric switching means for switching said rotation regulating means between said engaged position and said disengaged position, said electric switching means being energized such that said electric switching means places and holds said rotation regulating means in said disengaged position while said vehicle is running.

2. An actuator according to claim 1, further comprising a back plate for limiting heat conduction from said friction member to said electric switching means.

3. An actuator according to claim 2, wherein said electric switching means is positioned on an opposite side of said back plate with respect to said friction member.

4. An actuator according to claim 1, wherein said electric switching means is positioned on an opposite side of said rotatable element with respect to said driving motor.

5. An actuator according to claim 1, wherein said electric switching means is more distant from said friction member than is said driving motor.

6. An actuator according to claim 1, wherein:

said actuator is mounted on an actuator mounting member; and said electric switching means is positioned on an opposite side of said actuator mounting member with respect to said friction member.

7. An actuator according to claim 1, wherein:

said actuator is mounted on an actuator mounting member; and said electric switching means is positioned adjacent to said actuator mounting member.

8. An actuator according to claim 1, wherein:

said rotatable element includes a first pinion that is secured to a rotation shaft of said driving motor;

said electric switching means is an electric switching motor having a second pinion secured to a rotation shaft of said electric switching motor; and said rotation regulating means is a regulation gear that has a first engagement portion and a second engagement portion, said first engagement portion being meshed with said second pinion, said second engagement portion being engageable with said first pinion.

9. A brake device comprising:

a rotatable body that is connected to an axle shaft of a vehicle and integrally rotating with said axle shaft;

a friction member that is movable between an engaged position where said friction member is biased into engagement with said rotatable body to apply a braking force against said rotatable body and a disengaged position where said friction member is disengaged from said rotatable body;

a driving motor that rotates forward and backward to generate a driving force to move said friction member between said engaged position and said disengaged position;

a driving force transmitting means for transmitting said driving force of said driving motor to said friction member, said driving force transmitting means including:

a rotatable element that rotates forward and backward as said driving motor rotates forward and backward, respectively; and an operation shaft that moves said friction member between said engaged position and said disengaged position based on said forward and backward rotation of said rotatable element, respectively;

a rotation regulating means that is movable between an engaged position where said rotation regulating means is engaged with said rotatable element and a disengaged position where said rotation regulating means is disengaged from said rotatable element, wherein:

while said rotation regulating means is in said engaged position, said rotation regulating means prevents at least one of forward and backward rotations of said rotatable element; and while said rotation regulating means is in said disengaged position, said rotation regulating means allows said at least one of said forward and backward rotations of said rotatable element;

an electric switching means for switching said rotation regulating means between said engaged position and said disengaged position; and a control means for controlling energization of said electric switching means such that said electric switching means places and holds said rotation regulating means in said disengaged position while said vehicle is running.

10. An actuator for actuating a brake device, said brake device including a rotatable body and a friction member, said rotatable body being connected to an axle shaft of a vehicle and integrally rotating with said axle shaft, said friction member being movable between an engaged position where said friction member is biased into engagement with said rotatable body to apply a braking force against said rotatable body and a disengaged position where said friction member is disengaged from said rotatable body, said actuator comprising:

a driving motor that rotates forward and backward to generate a driving force to move said friction member between said engaged position and said disengaged position;

a driving force transmitting means for transmitting said driving force of said driving motor to said friction member, said driving force transmitting means including:

a rotatable element that rotates forward and backward as said driving motor rotates forward and backward, respectively; and an operation shaft that moves said friction member between said engaged position and said disengaged position based on said forward and backward rotation of said rotatable element, respectively;

a rotation regulating means that is movable between an engaged position where said rotation regulating means is engaged with said rotatable element and a disengaged position where said rotation regulating means is disengaged from said rotatable element, wherein:

while said rotation regulating means is in said engaged position, said rotation regulating means prevents at least one of forward and backward rotations of said rotatable element; and while said rotation regulating means is in said disengaged position, said rotation regulating means allows said at least one of said forward and backward rotations of said rotatable element;

an electric switching means for switching said rotation regulating means between said engaged position and said disengaged position; and a control means for controlling energization of said electric switching means such that said electric switching means places and holds said rotation regulating means in said disengaged position while said vehicle is running.

* * * * *